US 7,352,322 B2

(12) United States Patent
Tsujimoto et al.

(10) Patent No.: US 7,352,322 B2
(45) Date of Patent: *Apr. 1, 2008

(54) GPS-BASED POSITIONING SYSTEM FOR MOBILE GPS TERMINALS

(75) Inventors: Ikuo Tsujimoto, Nara (JP); Junichi Suzuki, Osaka (JP); Chiayee Steve Chang, San Jose, CA (US); Lionel Jacques Garin, Palo Alto, CA (US); Ashutosh Pande, Milpitas, CA (US)

(73) Assignees: SiRF Technology, Inc., San Jose, CA (US); Matsushita Electric Works, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/312,250

(22) Filed: Dec. 19, 2005

(65) Prior Publication Data

US 2006/0202887 A1    Sep. 14, 2006

Related U.S. Application Data

(63) Continuation of application No. 10/213,767, filed on Aug. 7, 2002, now Pat. No. 7,009,555, which is a continuation of application No. 09/828,066, filed on Apr. 5, 2001, now Pat. No. 6,462,708.

(51) Int. Cl.
H04B 7/185 (2006.01)
G01S 5/02 (2006.01)
(52) U.S. Cl. .............................. 342/357.09; 342/357.06
(58) Field of Classification Search ........... 342/357.05, 342/357.06, 357.09, 357.12, 357.1; 701/213, 701/215
See application file for complete search history.

(56) References Cited

U.S. PATENT DOCUMENTS

| | | | | |
|---|---|---|---|---|
| 5,831,545 A | * | 11/1998 | Murray et al. | 340/7.27 |
| 6,006,151 A | * | 12/1999 | Graf | 701/57 |
| 6,236,359 B1 | * | 5/2001 | Watters et al. | 342/357.1 |
| 6,462,708 B1 | * | 10/2002 | Tsujimoto et al. | 342/357.09 |
| 6,735,523 B1 | * | 5/2004 | Lin et al. | 701/216 |
| 7,009,555 B2 | * | 3/2006 | Tsujimoto et al. | 342/357.1 |
| 2005/0140544 A1 | * | 6/2005 | Hamel et al. | 342/357.08 |

* cited by examiner

*Primary Examiner*—Dao Phan
(74) *Attorney, Agent, or Firm*—The Eclipse Group LLP

(57) ABSTRACT

The present invention discloses a GPS system that uses call-processor intelligence to determine the mode of operation of a GPS receiver located in a GPS terminal. The modes are selected based on the availability of network facilities, the GPS information that can be acquired, or user input requirements.

19 Claims, 6 Drawing Sheets

GPS-BASED POSITIONING SYSTEM FOR MOBILE GPS TERMINALS

RELATED APPLICATIONS

This application is a continuation of U.S. patent application Ser. No. 10/213,767, filed on Aug. 7, 2002, now U.S. Pat. No. 7,009,555, B2, which was a continuation of U.S. patent application Ser. No. 09/828,066, file on Apr. 5, 2001, now U.S. Pat. No. 6,462,708, which is incorporated by reference herein.

BACKGROUND OF THE INVENTION

1. Field of the Invention

The present invention relates in general to Global Positioning System (GPS) mobile terminals, and in particular to a call processing (CP) centric architecture for mobile GPS terminals.

2. Description of the Related Art

Cellular telephony, and the associated features of cellular telephony, have become a part of everyday life around the world. The use of cellular telephone devices to provide voice, data, and other services, such as internet access, has provided many conveniences to cellular system users.

A current thrust in the cellular arena is the integration of Global Positioning System (GPS) technology into cellular telephone devices and other wireless transceivers. The use of GPS information in the cellular telephone (cell phone) can be used by the user for navigation, location services, or for reporting the position of the phone to an outside agency such as emergency services, police, or a friend, for ease of locating the cellular user.

Further, GPS data that is supplied to the mobile telephone can be used by the mobile telephone user for directions, latitude and longitude positions (locations or positions) of other locations or other mobile telephones that the cellular user is trying to locate, determination of relative location of the cellular user to other landmarks, directions for the cellular user via internet maps or other GPS mapping techniques, etc.

Cell phones can be used in many environments, e.g., outside, indoors, in urban environments, or in rural areas. As such, there are many situations where a cell phone that has an integrated GPS receiver cannot receive GPS signals, because the cell phone is blocked from receiving such signals. Urban canyons, heavy foliage, or other scattering or blocking structures will prevent the receiver from getting the information it needs to determine the location of the cell phone. The cellular system can then be used to deliver information to the GPS receiver for the GPS receiver to perform the necessary calculations, however, the decision of what information is needed is currently resident outside of the call processing processor.

It can be seen that there is a need in the art for GPS enabled cellular telephones. It can also be seen that there is a need in the art for decision making intelligence within the call processing processor.

SUMMARY OF THE INVENTION

To minimize the limitations in the prior art described above and to minimize other limitations that will become apparent upon reading and understanding the present specification, the present invention discloses a system determining the position of a GPS terminal. The system comprises a GPS terminal and a location aiding server. The GPS terminal includes a GPS section for receiving and processing a GPS signal, a strategy selector, external to and coupled to the GPS section, that determines a positioning strategy based upon a state of the GPS section, and a communication system, coupled to the GPS section and the strategy selector, for transmitting and receiving data to and from the location aiding server. The location aiding server communicates with the communications system of the GPS terminal via a communications network, and includes an aiding data generation section for forming location aiding data and a communication control section for transmitting data to and receiving data from the GPS terminal.

An object of the present invention is to provide for GPS enabled cellular telephones. Another object of the present invention is to provide a system that has decision making intelligence within the call processing processor.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

When integrating GPS components with wireless communications systems, the GPS system must have the capability to acquire and track the GPS satellites under the conditions that the typical wireless communications system user will encounter. Some of those conditions, e.g., indoor use, dense urban areas use that has a limited sky view, such as in downtown areas with skyscrapers blocking satellite views, etc., are possible with terrestrial-based wireless communications systems but present difficult situations for GPS systems. Traditional standalone mode GPS, e.g., where the GPS receiver does not receive any outside assistance, has problems with long Time To First Fix (TTFF) times, and also has limited ability to acquire the GPS satellite signals under indoor or limited sky-view conditions. Even with some additional information, TTFF times can be over thirty seconds because ephemeris data must be acquired from the GPS system itself, and also requires a strong signal to acquire such information reliably. These requirements of the GPS system have impacts on the reliability of position availability as well as power consumption in handheld GPS terminals.

Overview of the Present Invention

In the present invention, a server-client (or server-terminal) architecture is used. The terminal-side user has a GPS terminal, such as a cellular phone, and directly accesses to the terminal via a user interface section of the terminal. The server-side user can access the server via a user interface section of the server or from a user terminal via a network. Accordingly, a positioning request from a user needs to be received at both the terminal and the server. Furthermore, notice of a positioning result to a user needs to be made to both the terminal-side user and the server-side user.

GPS Architecture

Figure 1:
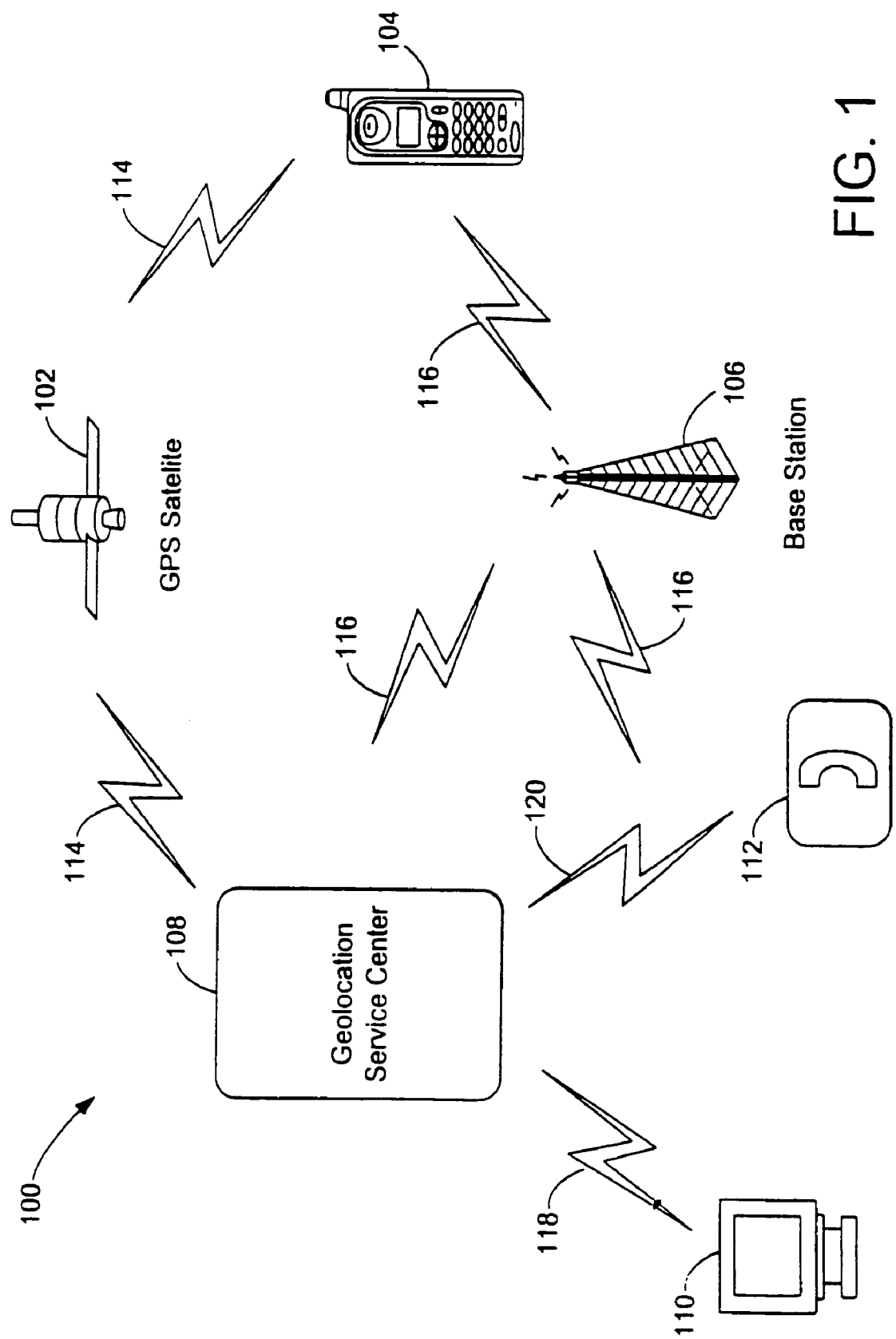
FIG. 1 illustrates a typical GPS architecture as used in a cellular environment.

FIG. 1 illustrates a typical GPS architecture as used in a cellular environment.

The wireless handset location technology of the present invention uses GPS technology in support of various wireless handset devices for the implementation of E911 and geo-location services. By taking the advantage of the low cost, low power, high performance and high accuracy GPS receivers enabled by the present invention, as well as the wireless network communication services, the wireless handset location technology of the present invention provides highly reliable and economical solutions to the Wireless Aided GPS.

The wireless handset location technology of the present invention supports all kinds of geo-location services, from fully standalone mode, network aided mode, to network based service mode, to other modes. The technology of the present invention also accommodates wide range of wireless communication platforms, including CDMA, TDMA, AMP, and even pager systems. FIG. 1 portrays the concept of wireless handset location technology.

System 100 illustrates a GPS satellite 102, which is illustrative of the constellation of GPS satellites 102 that are in orbit, a wireless GPS terminal 104 that comprises a GPS receiver, a base station 106, a geo-location (server) service center 108, a geo-location end application 110, and a Public Safety Answering Point (PSAP) 112.

The GPS satellite 102 transmits spread spectrum signals 114 that are received at the wireless GPS terminal 104 and the geo-location server 108. For ease of illustrative purposes, the other GPS satellites 102 are not shown, however, other GPS satellites 102 also are transmitting signals 114 that are received by the wireless GPS terminal 104 and the geo-location server 108. If the wireless GPS terminal 104 can receive a strong enough signals 114, the GPS receiver in the wireless GPS terminal 104 can compute the position of the wireless GPS terminal 104 as is typically done in the GPS system. However, wireless GPS terminals are typically not able to receive strong enough signals 114, or are not able to receive signals from enough GPS satellites 102 to autonomously compute the position of the wireless GPS terminal 104, but can still communicate with the base station 106. Thus, the base station 106 can communicate information via signals 116 to the GPS terminal 104 to allow the GPS terminal 104 to compute the location. If the basestation 106 is transferring information to the GPS terminal 104 to allow the GPS terminal 104 to compute position, it is called "wireless-aided GPS". Furthermore, the basestation 106 can communicate aiding data from the geolocation server 108 to the GPS terminal 104 to allow the GPS terminal 104 to compute its position, or can communicate information from the GPS terminal 104 to the geo-location server 108 to allow the geo-location server 108 to compute the position of the GPS terminal 104. When the basestation 106 transfers information from the geolocation server 108 to the GPS terminal 104 it is called "network aiding GPS", whereas when the basestation 106 transfers information from the GPS terminal 104 to the geo-location server 108 for the geo-location server 108 to compute the position of the GPS terminal 104 it is called "network-centric GPS."

The geolocation server 108 also communicates with the geolocation end application 110 via signals 118 and with PSAP 112 via signals 120. These signals 118 and 120 can either be via wireless links or can be through the land line telephone network or other wire-based networks.

The wireless GPS terminal 104 location technology of the present invention comprises two major service systems: the wireless GPS terminal 104 with the GPS receiver of the present invention and the geo-location server 108 containing the geo-location software modules of the present invention. In addition, there are two types of supporting systems: the Base Station (BS) 106 infrastructure, which provides the network information transfer mechanism, and the PSAP 112 or the application 110 system, which can initiate the geo-location network services.

Figure 2:
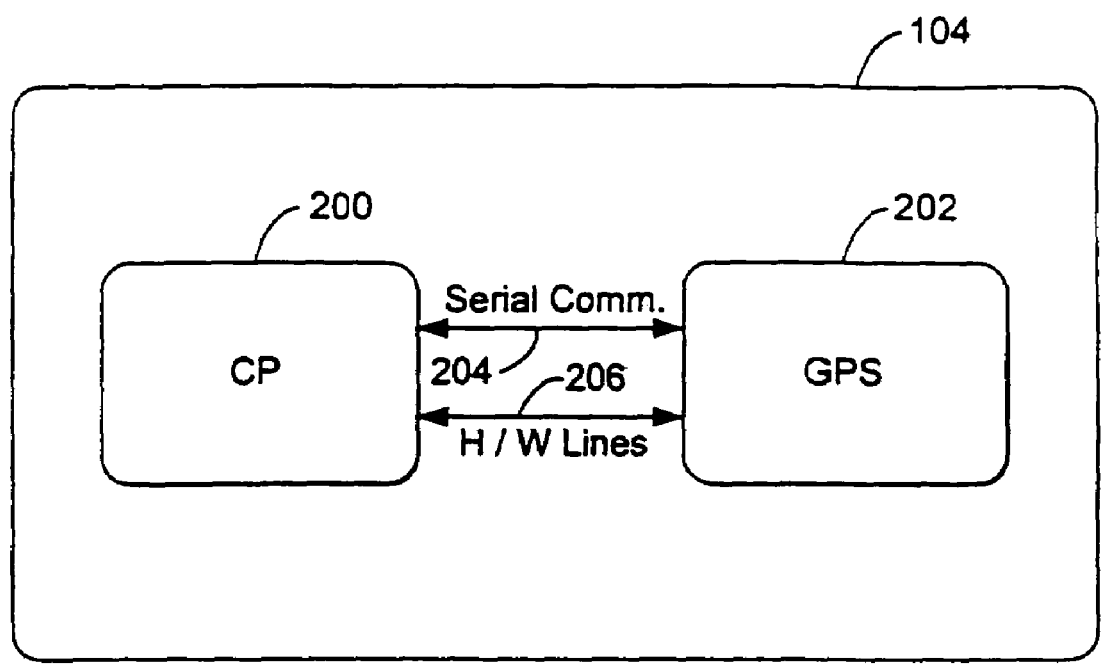
FIG. 2 shows a typical interface between the Call Processing section and the GPS section of the present invention.

FIG. 2 shows a typical interface between a Call Processing section and the GPS section of the present invention.

As shown in FIG. 2, the GPS terminal 104 comprises a Call Processing (CP) section 200 and a Global Positioning System (GPS) section 202. Within the GPS terminal 104, or, alternatively, between the GPS terminal 104 and an external accessory to the GPS terminal 104, communications between the CP section 200 and the GPS section 202 take place. These communications allow signals to be transferred from CP section 200 to GPS section 202, and typically take place on a serial communications link 204 and hardware lines 206, but other connections can be used if desired.

For example, in another implementation, the CP section 200 and the GPS section 202 can share the same digital processor and other circuitry. In such a case, the communication between sections can be made by inter-task communication, and certain data transfers, such as any time or frequency transfers between the CP section 200 and the GPS section 202, would not use the hardware lines 206, but would be internal to the circuitry or, potentially, no transfer would be required depending on the circuit design.

GPS Terminal

Figure 3:
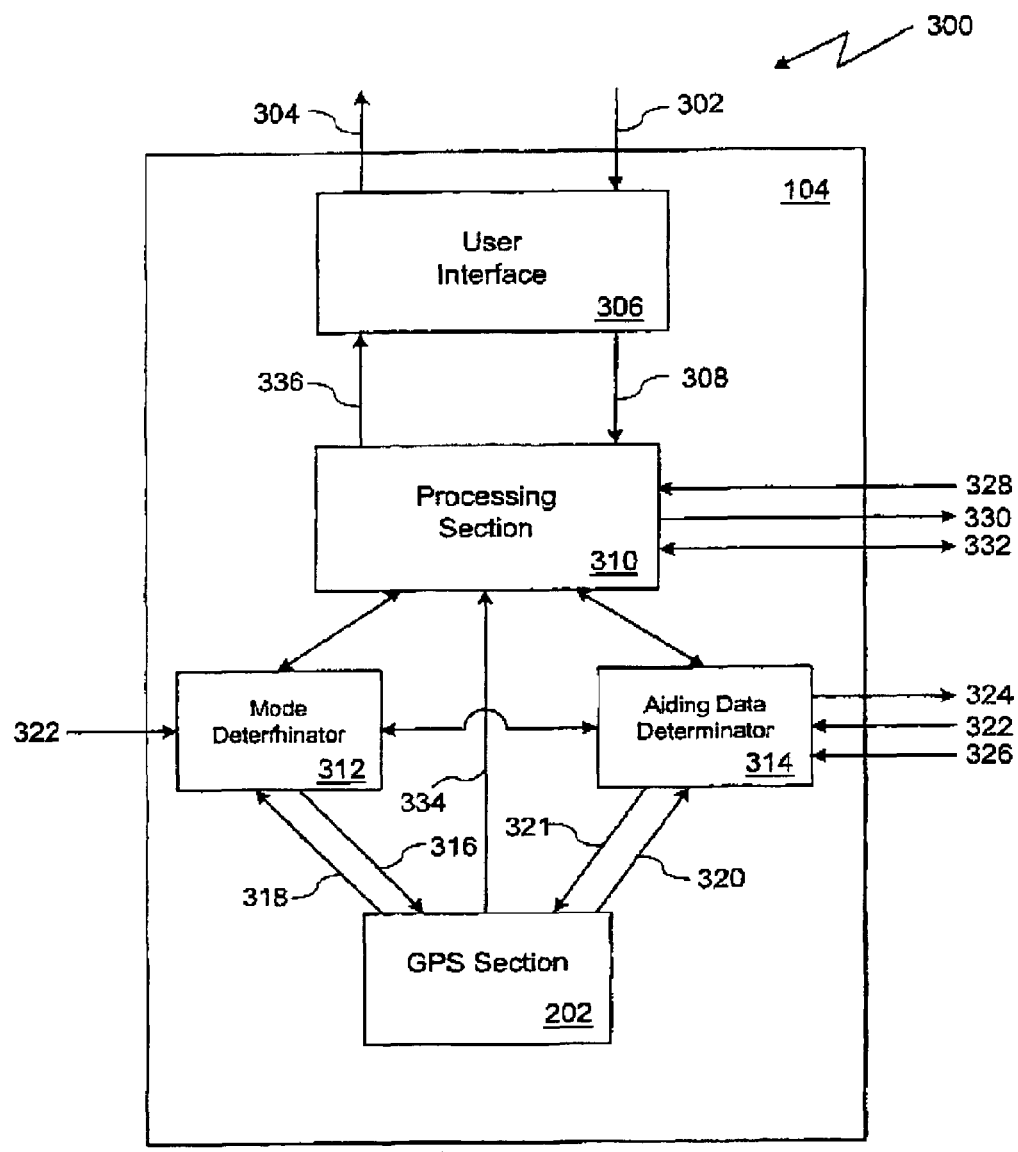
FIG. 3 illustrates details of a GPS terminal of the present invention.

FIG. 3 illustrates details of the GPS terminal 104 of the present invention.

GPS CP-centric terminal 104 (300) can receive user-generated positioning requests 302 and display positioning results 304 via a user interface 306. In turn, user interface 306 generates positioning request 308 which is used by a processing section 310 in determining which variables must be set, etc. to determine the position of the GPS terminal 300.

Included in the positioning request 308 are positioning requirements, e.g., position accuracy, positioning time, positioning cost, etc., and a destination notification, e.g., to which side of the user the position result should be sent, the GPS terminal side, or the geo-location server side. The information about destination is stored in the processing section 310 of the GPS terminal 104 and is used to notify the user of the route and the result of the location determination (the positioning result). The positioning requirements are then transmitted to the mode determinator 312 and to the aiding data determinator 314.

The mode determinator 312 and the aiding data determinator 314 interface with the GPS section 202. The mode determinator 312 sends information 316 to the GPS section 202, e.g., positioning requirements, etc. The GPS section 202 then sends state information 318 of the GPS section 202 to the mode determinator 312.

The aiding data determinator 314 receives request 320 from the GPS section 202 which asks the aiding data determinator 314 for assistance in acquisition or tracking of GPS signals being performed by the GPS section 202. The aiding data determinator 314 returns aiding data 321 to the GPS section 202.

GPS Terminal Operation

Typically, a user will access the GPS terminal 104 via the user interface 306. The user will make a position request 302, which request 308 is passed to the processing section 310. The destination notification included in the position request is stored in processing section 310. The processing section 310 determines what mode the GPS section 202 will use via the mode determinator 312. The GPS section 202 either provides without query, or, upon query, a predicted accuracy and TTFF to the mode determinator 312 and the aiding data determinator 314.

The mode determinator 312 uses another input, a network communication state input 322, to determine which state the GPS section 202 will be operated in. If the network is not available, then the GPS section 202 operates in Stand Alone Mode. Otherwise, depending on the state result 318 of the GPS section 202, the GPS section 202 can be operated in other modes.

If the network communication state input 322 indicates that the network is available, the aiding data determinator 314 can ask the server 108 via the network connection 324 for an approximate position request. If such an approximate position is available, the server 108 will provide the approximate position 326 to the aiding data determinator 314, which transfers the aide 321 to the GPS section 202.

If the GPS terminal 104 position has been requested by the server 108, positioning request 328 is sent via the network from the server 108 to the processing section 310. The processing section 310 can also report a positioning result 330 to the server 108, as well as share a positioning result 332 with the server 108.

When a position result 334 (a location calculation) is determined by the GPS terminal 104, such information and destination notification is transmitted to the processing section of the server 108 via link 332 when the GPS terminal 104, specifically the mode determinator 312 portion of the call processor, selects a network-centric mode in which the server 108 will do final calculation such as differential correction. After the final calculation, the server 108 reports the position to the user of the server or sends back it to the GPS terminal 104 based on the destination notification. If the GPS section 202 of the GPS terminal 104 determines the location of the GPS terminal 104, it did not need further assistance, and therefore, information does not need to be transmitted to the server 108 for assistance. Finally, the position result 336 is forwarded from the processing section 310 to the user interface 306 for display 304 to the user if the destination notification indicates the position should be delivered to GPS terminal user. On the other hand, the final position result 336 is sent to the geolocation server 108 based on the destination notification.

Mode Determinator

The mode determinator 312 selects an optimum positioning mode based on the positioning request 302, the state 318 of the GPS section 202, and the state of the network 322. Several positioning modes, such as Stand Alone mode, Network Aiding mode and Server Centric mode are available to the mode determinator 312.

Stand Alone mode is a mode for performing positioning by only a terminal. Network Aiding mode is a mode for performing positioning by a terminal with being aided by a server. Server Centric Mode is a mode for performing positioning by a server.

The mode determinator 312 first acquires the positioning requirements via request 302. These requirements can be designated by the positioning request 302 and can be stored in the GPS terminal 104 in advance. Also the positioning requirements may be acquired by inquiring via the user interface section 306 of the GPS terminal 104 during positioning processing. The positioning requirements include a positioning accuracy request, a positioning sensitivity request, a positioning time request and a positioning cost request.

The mode determinator 312 selects Stand Alone mode when the mode determinator 312 determines, from the positioning cost request and the communication state 322 of the network, that the modes using a network are disabled. The modes using a network are Network Aiding mode, and Server Centric mode. The mode determinator 312 also selects Stand Alone mode when the cost exceeds the positioning cost request by the user, or in the case where it is impossible to use the network.

Next, the mode determinator 312 checks the positioning accuracy request, and where the accuracy request exceeds a possible level in the GPS terminal 104 positioning, the Sever Centric mode, which enables positioning operation with higher accuracy, is selected. Furthermore, when communication delay of the communication state of the network exceeds the upper limit that can ensure necessary accuracy in the positioning modes using a network, Stand Alone mode is selected.

Next, the mode determinator 312 determines whether aiding by the server 108 is necessary based on the positioning sensitivity request and the positioning states of the GPS section 202. In the case where the signal level of the satellites being acquired is lower than or equal to the lower limit that the terminal can acquire Ephemeris and time, and the positioning sensitivity request requests for the sensitivity that can be positioned by signals of the level lower than or equal to this level, aiding from the server 108 becomes essential for positioning, so that Network Aiding mode is selected.

The mode determinator 312 carries out prediction calculation of positioning time for each mode, and compares the result with the positioning time request of the positioning requirements. For prediction of the positioning time, positioning states 318 of the GPS section 202 are used. Positioning states 312 of the GPS section 202 include presence/absence of correct time and Ephemeris necessary for positioning, a current step of the GPS section in the satellite acquiring processing and positioning operation, the number of acquired satellites and a signal level of the acquired satellites as acquiring states of satellites are used. For prediction of the positioning time, besides the positioning states 318, the communication state 322 of the network and the positioning sensitivity request of the positioning requirements of the positioning request 302 are used.

When the predicted positioning time is shorter than the positioning time request, the mode determinator 312 gives a priority on the positioning cost and selects Stand Alone mode. In the case where the predicted positioning time is longer than the positioning time request, the mode for minimizing the positioning time is selected.

Aiding Data Determinator

The aiding data determinator 314 processes approximate position data 326 from the server 108, and determines what, if any, aiding data that the GPS section 202 needs. The terminal approximate position 326 is used for increasing the speed of acquiring a signal from a GPS satellite 102 by the GPS section 202.

The aiding data determinator 314 first acquires positioning requirements designated by the user when a position request 302 is made. These requirements can be designated by the positioning request 302 and can be stored in the GPS terminal 104 in advance. Furthermore, the positioning requirements may be acquired by inquiring the user via the user interface 306 of the GPS terminal 104 during positioning processing.

The aiding data determinator 314 performs a prediction calculation of positioning time both with and without the approximate position data 326. These results are compared with the positioning time request and the positioning requirements in request 302. The aiding data determinator 314 also uses positioning state 320 of the GPS section 202 to predict the positioning time. A positioning state 320 of the GPS section 202 can be one or more of the following: elapsed time since the last position; presence or absence of a position calculation within a predetermined time period; the current processing step in a satellite acquiring processing sequence in the GPS section 202; the number of acquired satellites; and a signal level of the acquired satellites.

When the predicted positioning time is shorter than the positioning time request, the aiding data determinator 314 waits for the GPS section 202 to carry out positioning while checking the positioning state 320 of the GPS section 202 without acquiring approximate position data 326. If there is a change in the positioning state 320 of the GPS section 202, the flow returns to the prediction calculation processing of positioning time. If the GPS section 202 completes the position calculation before an approximate position is determined, acquisition of the approximate position data 326 is skipped.

When the predicted positioning time is longer than the positioning time request, then the positioning time and the cost, e.g., the amount of time it will take at a certain cost per unit time of using the network, the cost for information being sent by the network, etc., at the time of acquiring an approximate position are calculated. To properly determine the cost, states such as the communication speed of the network used for acquiring an approximate position, communication cost, and cost of the approximate position acquiring service are used. Depending on the predicted calculation time, the cost of acquiring an approximate position, and the required postioning time, an approximate position can be acquired from the server 108.

When the positioning time does not become shorter even if an approximate position is acquired, or in the case where the required cost exceeds the positioning cost request, a approximate position is not acquired. Furthermore, in the case where it is impossible to connect to the server, an approximate position is not acquired and the device proceeds with satellite acquiring processing.

Server Operation

Figure 4:
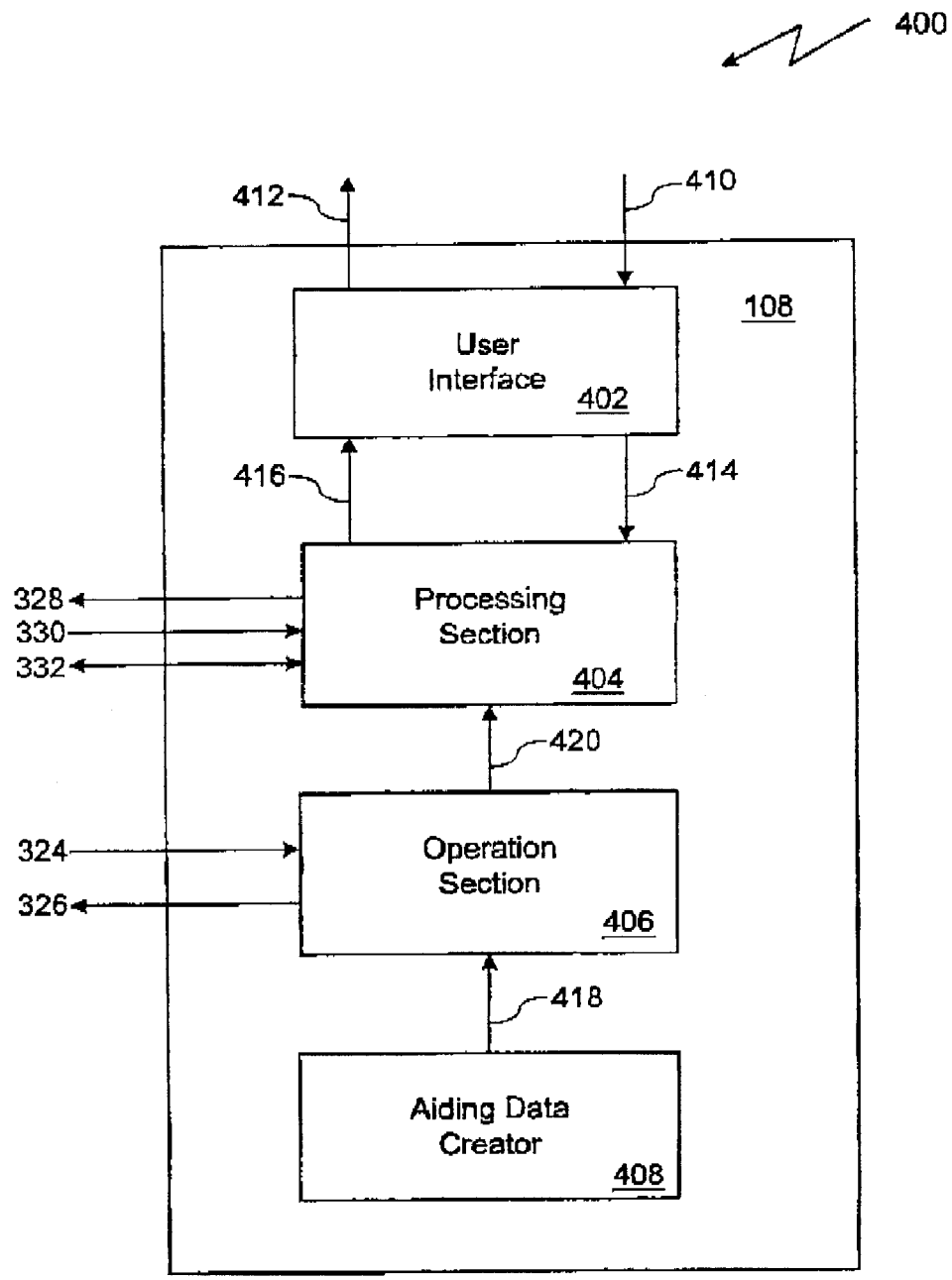
FIG. 4 illustrates a server in accordance with the present invention.

FIG. 4 illustrates a server 108 in accordance with the present invention.

System 400 illustrates the server 108, having a user interface 402, a processing section 404, operation section 406, and aiding data creator 408.

The user interface 402 can receive a position request 410 from the server 108 user, and deliver a positioning result 412 to the user. User interface also sends the position request 414 to the processing section 404, and receives results 416 from the processing section 404.

The processing section 404 sends server calculated results 328 to the GPS terminal 300, receives terminal-calculated results 330 from the GPS terminal 300, and shares results and destination notification 332 with processing section 310 of the GPS terminal 300. The processing section 404 also receives positioning results from operation section 406.

The operation section 406 receives aiding data 418 from a aiding data creator 408, and either uses that data 418 to determine a position result 420 to report to the processing section 404, or sends the aiding data 326 to the GPS terminal 104, either in response to a request 324 or automatically.

Server Operation

The user interface 402 enables the user to directly input a positioning request to the server 108 and to input a positioning request from the user terminal via a network. Included in the positioning request 410 are positioning requirements, e.g. positioning accuracy, positioning time, positioning cost, etc. and a destination notification. The processing section 404 of the server 108 transmits the inputted positioning request 328 to the processing section 310 of the GPS terminal 104. Furthermore, the notifying destination information included in the positioning request is stored in the processing section 404 of the server 108 for use in notification of a positioning result and it is also sent to the GPS terminal 104 via link 332. A positioning result is obtained either in the GPS section 202 of the GPS terminal 104 or in the operation section 406 of the server 108 depending on the positioning mode selected by the mode determinator 310.

When the positioning result is obtained in the GPS section 202 of the GPS terminal 104, the GPS section 202 transmits the positioning result 334 to the processing section 310 of the GPS terminal 104. The processing section 310 of the GPS terminal 104 informs the user of the positioning result 304 via the user interface 306 of the GPS terminal 104, or transmits the positioning result 330 to the processing section 404 of the server 108 on the basis of the stored notifying destination information. The positioning result 330 transmitted to the processing section 404 of the server 108 is given to the server 108 user via the user interface 402 on the basis of the stored notifying destination information.

When the positioning result is obtained in the operation section 406 of the server 108, the operation section 406 transmits the positioning result to the processing section 404 of the server 108. The processing section 404 of the server 108 directly sends the positioning result to the user via the user interface 402 of the server 108 or transmits the positioning result 328 to the processing section 310 of the GPS terminal 104 on the basis of the stored notifying destination information.

Process Charts

Figure 5:
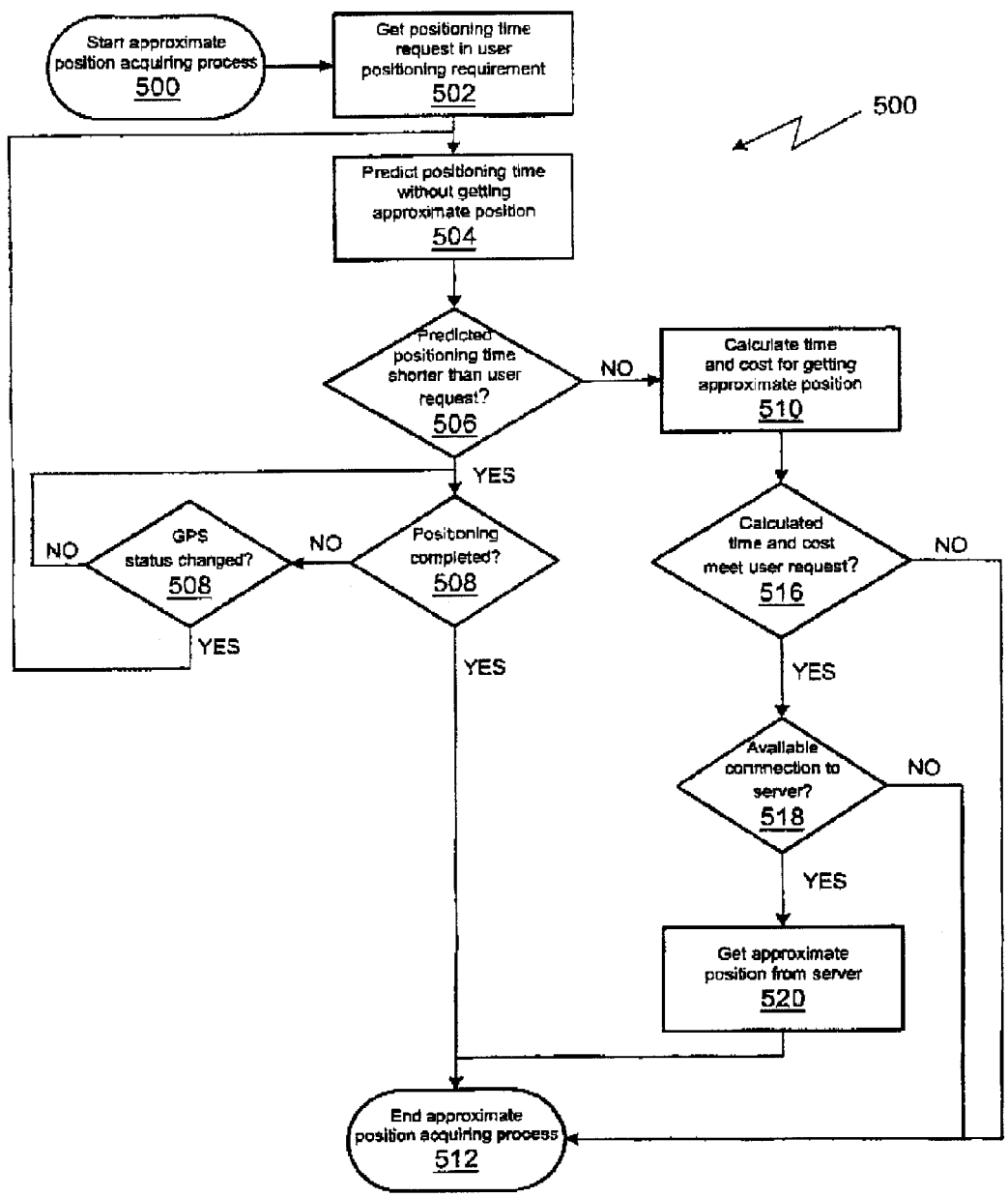
FIGS. 5 and 6 are flowcharts illustrating the steps used to practice the present invention.
Figure 6:
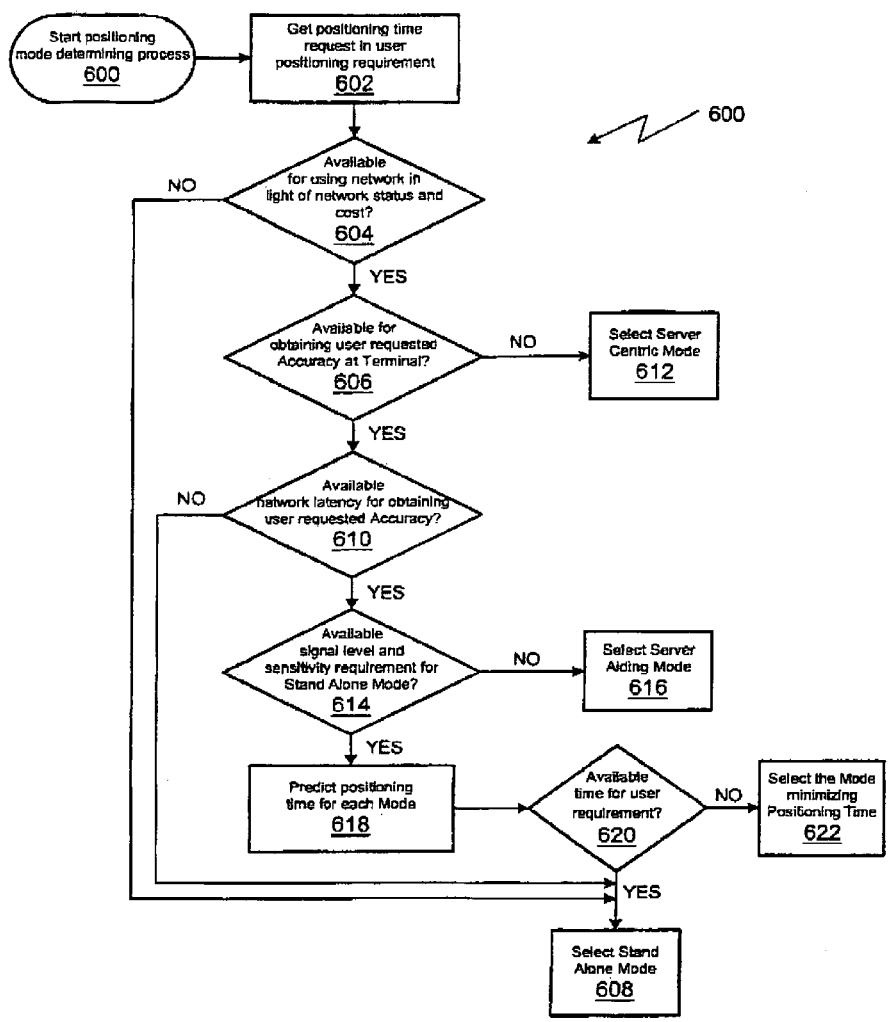

FIGS. 5 and 6 are flowcharts illustrating the steps used to practice the present invention.

Block 500 illustrates starting the approximate position acquisition process.

Block 502 illustrates acquiring the positioning time request in the user positioning requirement. Block 504 illustrates predicting the positioning time without getting an approximate position.

Block 506 is a decision block that determines whether the predicted positioning time is shorter than the positioning time requested by the user. If the predicted positioning time is shorter than the requested time, control passes to block 508; if not, control passes to block 510.

Block 508 is a decision block that determines if the positioning calculation is completed. If so, control passes to block 512; otherwise, control passes to block 514.

Block 514 is a decision block that determines if the GPS state has changed. If so, control passes back to the input to block 504; otherwise, control returns to the input to block 508.

Block 510 determines the time and cost for getting an approximate position.

Block 516 is a decision block that determines if the calculated time and cost for acquiring an approximate position meet the user request. If so, control passes to block 518; otherwise, control passes to block 512.

Block 518 is a decision block that determines if there is an available connection to the server. If so, control passes to block 520, where an approximate position is acquired from the server, and control then passes to block 520. Otherwise, control passes to block 512, which ends the approximate position acquisition process.

FIG. 6 starts with block 600, the beginning of the positioning mode determination process. Block 602 illustrates acquiring the positioning time request from the user positioning requirement. Block 604 is a decision block that determines if the network is available given the network status and the cost of using the network. If the network is determined to be available, control passes to block 606, otherwise, block 608 is selected, where the stand-alone mode is selected.

Block 606 is a decision block that determines if the user requested accuracy is available at the GPS terminal. If so, control passes to block 610; if not, control passes to block 612, where the server centric mode selected.

Block 610 is a decision block that determines if the network latency for obtaining the user requested accuracy is acceptable. If so, control passes to block 614; if not, control passes to block 608, where the stand-alone mode is selected.

Block 614 is a decision block that determines if the signal level and sensitivity required for stand-alone mode are available. If not, control passes to block 616, where the server aiding mode is selected. If so, control passes to block 618, where the positioning time for each mode is determined.

Block 620 is a decision block that determines whether there is enough available time for the user requirement in stand-alone mode. If so, the stand-alone mode is selected in block 608; otherwise, block 620 is used to select the mode that minimizes the positioning time.

CONCLUSION

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention.

In summary, the present invention discloses a system determining the position of a GPS terminal. The system comprises a GPS terminal and a location aiding server. The GPS terminal includes a GPS section for receiving and processing a GPS signal, a strategy selector, external to and coupled to the GPS section, that determines a positioning strategy based upon a state of the GPS section, and a communication system, coupled to the GPS section and the strategy selector, for transmitting and receiving data to and from the location aiding server. The location aiding server communicates with the communications system of the GPS terminal via a communications network, and includes an aiding data generation section for forming location aiding data and a communication control section for transmitting data to and receiving data from the GPS terminal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto.

What is claimed is:

1. A Global Positioning System (GPS)-based positioning system, comprising:
   (a) a GPS terminal, including:
      (i) a GPS section for receiving and processing a GPS signal;
      (ii) a strategy selector, external to and coupled to the GPS section, that determines a positioning strategy based upon a state of the GPS section and has a mode determinator for determining a mode of operation of the GPS section that uses positioning requirements received from the GPS section; and
      (iii) a communication system, coupled to the GPS section and the strategy selector, for transmitting and receiving data to and from a location aiding server, and
   (b) a location aiding server, which communicates with the communications system of the GPS terminal via a communication network including:
      (i) an aiding data generation section for forming location aiding date; and
      (ii) a communication control section for transmitting date to and receiving data from the GPS terminal.

2. The system of claim 1, wherein the location aiding server calculates a position of the GPS terminal based upon date received from the GPS terminal.

3. The system of claim 1, wherein the state of the GPS section is determined by at least one parameter selected from a group comprising: a signal level of received satellite signals, a number of satellites from which signals are being received, a frequency range used for searching for satellites, a time range used for searching for satellites, a current searching status, and a state in a positioning process sequence.

4. The system of claim 1, further comprising a time estimator for computing an estimated positioning time based upon the state of the GPS section, wherein the mode determinator determines the mode of operation of the GPS section based upon computed estimated positioning time.

5. The system of claim 1, wherein the mode determinator determines the mode of operation by using at least one parameter selected from a group comprising: a communication state of the communications network between the GPS terminal and the location aiding server, a communications cost, and a user request, wherein the user request is at least on request selected from a group comprising: positioning accuracy, positioning time, positioning costs, and positioning sensitivity.

6. The system of claim 5, wherein the communication state is determined by at least one parameter selected from a group comprising: an availability of a communication link to the location aiding server, an effective data transmission rate between the GPS terminal and the location aiding server, and a communication delay characteristic between the GPS terminal and the location aiding server.

7. The system of claim 1, wherein the GPS terminal further comprises a terminal destination calculator for selecting a destination of a terminal calculated position of the GPS terminal and for sending the position, and wherein the location aiding server further comprises a server destination calculator for selecting a destination of a server calculated position of the GPS terminal and for sending a server calculated position of the GPS terminal.

8. The system of claim 7, wherein the destination of the calculated position of the GPS terminal is shared between the GPS terminal and the location aiding server.

9. The system of claim 1, wherein the strategy selector comprises an aiding data determinator for determining a method for acquiring position aiding data based upon the state of the GPS section.

10. The system of claim 9, wherein the state of the GPS section is determined by at least on parameter selected from a group comprising a signal level of received satellite signals, number of satellites from which signals are being received, a frequency range used for searching for satellites, a time range used for searching for satellites, a current searching status, and a state in a positioning process sequence.

11. The system of claim 9, further comprising a time estimator for computing an estimated positioning time based upon the state of the GPS section, wherein the aiding data determinator determines the acquiring method based upon the computed estimated positioning time.

12. The system of claim 9, wherein the aiding data determinator determines the acquiring method based on at least one parameter selected from a group comprising: a communication state of the communications network between the GPS terminal and the location aiding server, a communications cost, and a user request, wherein the user request us at least one request selected from a group comprising: positioning accuracy, positioning time, positioning costs, and positioning sensitivity.

13. The system of claim 1, wherein the communication state of the network is determined by at least one parameter selected from a group comprising: an availability of a communication link to the location aiding server, an effective data transmission rate of the network and communication delay characteristic of the network.

14. The system of claim 9, wherein the GPS terminal further comprises a terminal destination calculator for selecting a destination for the GPS terminal calculated position of the GPS terminal, and wherein the location aiding server further comprises a server destination calculator for selecting a destination for the GPS terminal and for sending a server calculated position of the GPS terminal.

15. The system of claim 14, wherein at least one of the server calculated position and the terminal calculated position of the GPS terminal is shared between the GPS terminal and the location aiding server.

16. The system of claim 9, wherein the aiding date being sent from the aiding date determinator to the GPS section is dynamically altered based on a change in the state of the GPS section.

17. The system of claim 1, wherein the GPS Section and the strategy selector pass information between the GPS section and the strategy selector.

18. The system of claim 17, wherein the information is selected from a group comprising real time data of the GPS section and a quality of service message.

19. The system of claim 18, wherein the quality of service message is at least one message selected from a group comprising: a request or automated positioning accuracy, a request or estimated positioning time, a request positioning sensitivity, or information for the necessity of aiding date, and a preferred mode of operation.

* * * * *